March 28, 1961 A. WITTE 2,977,164
ROLLER BEARINGS HAVING ROLLER CAGES OF SYNTHETIC MATERIAL
Filed Oct. 26, 1959

INVENTOR
ALFRED WITTE
By Shoemaker & Mattare
Attys.

United States Patent Office 2,977,164
Patented Mar. 28, 1961

2,977,164

ROLLER BEARINGS HAVING ROLLER CAGES OF SYNTHETIC MATERIAL

Alfred Witte, Bielefeld, Germany, assignor to Durkopp-werke Aktiengesellschaft, Bielefeld, Germany, a corporation of Germany Filed Oct. 26, 1959, Ser. No. 848,828

7 Claims. (Cl. 308—217)

This invention has as its subject matter a roller cage of synthetic material for the rollers of a roller bearing where such rollers are retained axially by a flange at each edge of the outer or inner race ring of the bearing. The invention is concerned with such synthetic cages which have rollers: separating bridge pieces projecting from one side face of a ring.

According to this invention, the cage is made of a resilient plastic material, for example polyurethane, and some or all the said separators project laterally from the ring to an extent such that, as the cage is inserted axially between the inner and outer races of the bearing said projecting separators are engaged and compressed by the roller-retaining flange on one of the races and, when they have passed such flange they resile and project behind the flange, thereby preventing withdrawal of the cage.

Usually the said separators will be of tapering form, diminishing in width from the outer end inwards, and their inner ends will be of such size as to pass on to the roller-retaining flange, thereby giving a lead to the said lateral compression as the cage is pushed into place.

According to another feature of the invention the said ring part of the cage has an internal diameter such that it fits closely over the roller retaining flange when provided on the inner race ring of the bearing, and an outer diameter such that it fits closely within the roller retaining flange when provided on the outer race ring of the bearing. In such event the roller separators will project from the ring both inwardly and outwardly so as to provide the same "snap-in" action whether the roller-retaining flange be on the inner or outer race ring.

Usually, each cage will be in two halves for entry into the bearing from opposite sides and the abutting faces of the roller-separators will have inter-engaging formations such as studs and sockets. By so arranging the studs and sockets on the respective separators, only one mould is required (for each size of bearing), the moulded parts being completely interchangeable as between the left-hand and right-hand sides of the bearing.

The two-part construction of a synthetic material roller bearing cage, compared with the known one-part construction, has advantages from the manufacturing and technical point of view, as the necessary under cutting of the roller engaging surfaces of the bridge pieces can be carried out without complicated sliding tools or the like which, for the most part, render possible only a simple form of mould. In a known two-part synthetic cage the roller-separating bridge pieces are divided obliquely to the axis of the cage, the bridge pieces thereby receiving a wedge-shaped cross section, and the oblique surfaces are interrupted by a step. On the putting together of the two halves of the cage, the individual bridge piece sections snap resiliently into one another, that is they are hooked one to another such that a subsequent taking apart of the cage is no longer possible. The cage therefore, as regards its construction, is virtually a one-piece cage.

The invention combines the economic manufacture of synthetic cages with an advantageous manner of construction insofar as it concerns bearings having an outer or an inner undivided race with a fixed roller-retaining flange.

The accompanying drawing illustrates one embodiment of the invention, as shown;

Figure 1:
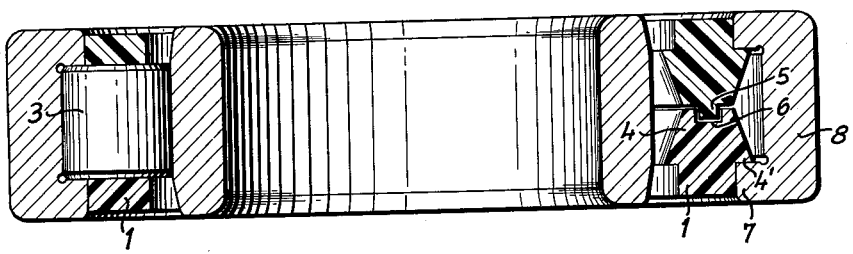
Fig. 1 is a diametral section through a roller bearing with flanged outer race.

The improved cage illustrated is in two end-to-end parts. Each part is made from polyurethane or some other suitable synthetic material having elastic properties, and consists of an outer ring part 1 of rectangular section and the inwardly-projecting roller-separating bridge pieces 4 which form the pockets 2 for receiving the roller bodies 3. Where the roller separating bridge pieces 4 adjoin the ring 1 they extend beyond the ring in a radial direction so as to project beyond the ring but outwardly from and inwardly towards the central axis of the bearing. Also these roller-separating bridge pieces 4 taper to a smaller radial width from the ring 1 towards these free ends and are thus formed of a wedge-shape in radial cross-section. On their end faces the bridge-pieces 4 are provided with projections 5 and recesses 6 which engage into one another when two of the cage parts are used as a pair as shown.

Figure 2:
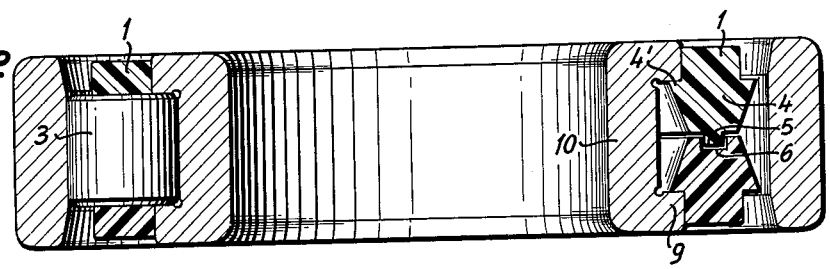
Figure 2 is a diametral section through a roller bearing with flanged inner race.
Figure 3:
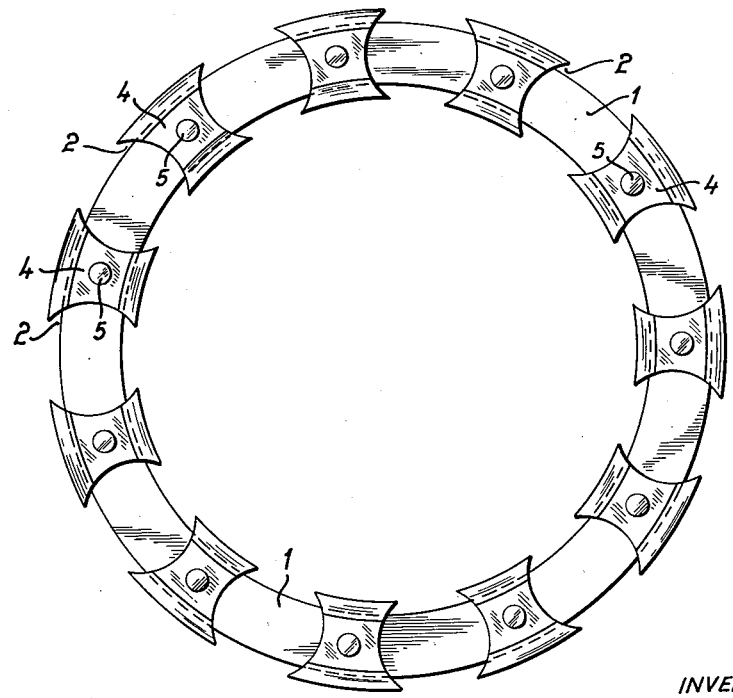
Fig. 3 is a view of the inner end of one of the cage parts.

In assembling the bearings the rollers and races are first brought together, with the rollers spaced apart between the races and the cage parts are then inserted axially with the separators 4 entering the spaces between the rollers. The cage parts in Fig. 1 are sprung with axial pressure into the outer race 8 which has a fixed flange 7, whereby the projecting parts $4^1$ of the bridge piece are compressed against the flange and eventually snap past the flange to resume their normal width behind the flange 7. This gives the cage a secure axial location in the race 8. Correspondingly, there is shown in Fig. 2 a similar construction where the inner race 10 is provided with a fixed flange 9, and where the radial compression and eventual resiling of the separators 4 takes place at the inner tapered faces of the separators 4.

It will be observed that exactly the same cage may be used (for the same size of bearing) whether the roller retaining flange is on the outer race as at 7 or on the inner race as at 9. Furthermore, whilst in some instances all the projections 5 may be on one cage part and all the sockets 6 be in the other cage part, each such part may be formed with projections on some separators 4 and sockets in the other separators 4 so that an identical moulding may be used for each of the two cage parts.

Instead of the roller-separating bridge piece being of increased width along their whole length, it will suffice in many cases to provide such bridge pieces with one or more projecting parts to engage and be compressed by the flange 7 or 9 of the race 8 or 10.

What I claim is:

1. A roller cage for a roller bearing having roller retaining flanges on one of its race rings comprising a synthetic moulding of a resilient plastic material having a ring portion to engage the edge of a roller retaining flange and axially directed spaced roller separators defining roller pockets, at least some of said separators each having a part extending radially beyond said ring for compression by and enlargement under the flange as the cage is entered axially between the race rings.

2. A roller cage as claimed in claim 1 wherein said ring portion has an outer diameter to fit a retaining flange on an outer race ring and wherein the said separators have parts extending radially beyond the edges of said ring portion.

3. A roller cage as claimed in claim 1, wherein said ring portion has an inner diameter to fit a retaining flange on an inner race ring and wherein the said separators have parts extending radially beyond the edges of said ring portion.

4. A roller cage for a roller bearing comprising a one-piece moulding of a resilient synthetic plastic material having a ring portion of rectangular section and having roller separators extending at equally spaced intervals from one side face of such ring portion each such separator having concave ends to rest against adjacent rollers of the bearing, being of diminishing width outwardly from the said ring portion and being wider at its widest part than said ring portion so as to project beyond the radially inner and radially outer corners of the ring portion.

5. A roller cage for a roller bearing comprising two one-piece mouldings according to claim 4 with the separators of one meeting the separators of the other, the meeting faces of the separators having inter-engaging projection and socket formations.

6. A roller bearing comprising inner and outer races each in one piece and spaced rollers therebetween, flanges at the edges of one race directed towards the other race and extending over the ends of said rollers, the inner edge of said flange defining an annular space around said other race, and a roller cage comprising a resilient synthetic moulding having a ring part lying in said annular space with a series of roller separators extending between and locating said rollers each such separator tapering in width from a smaller end distant from said ring and the larger end adjoining said ring and able to enter said annular space with the larger end extending behind said flange.

7. A roller bearing according to claim 6, having two said cages entered from opposite sides some of the separators of one having projections to enter complemental sockets on the remaining separators of the other.

No references cited.